United States Patent
Ganzel

(10) Patent No.: US 12,240,427 B2
(45) Date of Patent: Mar. 4, 2025

(54) FAST REPLENISHING BRAKE SYSTEM

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 351 days.

(21) Appl. No.: 17/708,153

(22) Filed: Mar. 30, 2022

(65) Prior Publication Data

US 2023/0311833 A1    Oct. 5, 2023

(51) Int. Cl.
*B60T 13/68* (2006.01)
*B60T 7/04* (2006.01)
(Continued)

(52) U.S. Cl.
CPC .......... *B60T 13/686* (2013.01); *B60T 7/042* (2013.01); *B60T 8/326* (2013.01); *B60T 13/148* (2013.01);
(Continued)

(58) Field of Classification Search
CPC ...... B60T 13/686; B60T 13/148; B60T 13/58; B60T 13/662; B60T 7/042;
(Continued)

(56) References Cited

U.S. PATENT DOCUMENTS 9,827,960 B2    11/2017 Feigel et al.
10,076,961 B2 *  9/2018 Seol .......................... B60T 1/10
(Continued)

FOREIGN PATENT DOCUMENTS

DE    102016203563 A1    9/2007
DE    102012210809 A1    1/2013
(Continued)

OTHER PUBLICATIONS

German Search Report for corresponding Application No. 10 2023 202 536.1 dated Nov. 28, 2023, pp. 1-16.
(Continued)

*Primary Examiner* — Thomas J Williams
(74) *Attorney, Agent, or Firm* — Tarolli, Sundheim, Covell & Tummino LLP

(57) ABSTRACT

A brake system includes a source of pressurized hydraulic fluid, a plurality of wheel brakes, and an iso/dump control valve arrangement associated with at least one wheel brake. A reservoir is connected to the source of pressurized fluid and to the iso/dump control valve arrangement. A fast-replenishing circuit includes a FR iso valve, a venting valve, and a replenishing check valve. The venting and replenishing check valves are interposed between the source of pressurized fluid and the reservoir. The FR iso valve is interposed between the source of pressurized fluid and the iso/dump control valve arrangement. When the source of pressurized fluid reaches a predetermined stroke position, the FR iso valve is energized to restrict movement of fluid from at least one iso/dump control valve arrangement to the source of pressurized fluid. The source of pressurized fluid is re-stroked to draw fluid from the reservoir through the replenishing check valve.

12 Claims, 4 Drawing Sheets

(51) Int. Cl.
  *B60T 8/32* (2006.01)
  *B60T 13/14* (2006.01)
  *B60T 13/58* (2006.01)
(52) U.S. Cl.
  CPC ........... *B60T 13/58* (2013.01); *B60T 2270/10* (2013.01); *B60T 2270/402* (2013.01); *B60T 2270/403* (2013.01); *B60T 2270/404* (2013.01); *B60T 2270/82* (2013.01)
(58) Field of Classification Search
  CPC .......... B60T 2270/10; B60T 2270/402; B60T 2270/403; B60T 2270/404; B60T 2270/82
  See application file for complete search history.

(56) References Cited

U.S. PATENT DOCUMENTS

| | | | |
|---|---|---|---|
| 11,919,500 B2* | 3/2024 | Ganzel | B60T 8/366 |
| 12,115,963 B2* | 10/2024 | Ganzel | B60T 13/58 |
| 12,145,563 B2* | 11/2024 | Ganzel | B60T 15/028 |
| 2003/0020327 A1 | 1/2003 | Isono et al. | |
| 2018/0194337 A1* | 7/2018 | Leiber | B60T 17/22 |
| 2019/0299962 A1* | 10/2019 | Leiber | B60T 17/226 |
| 2019/0366997 A1* | 12/2019 | Jeong | B60T 13/167 |
| 2020/0331444 A1* | 10/2020 | Cheon | B60T 7/042 |
| 2020/0353910 A1* | 11/2020 | Seol | B60T 13/142 |
| 2021/0053542 A1* | 2/2021 | Koo | B60T 13/662 |
| 2021/0101575 A1* | 4/2021 | Ahn | B60T 8/326 |
| 2021/0261109 A1* | 8/2021 | Ganzel | B60T 7/042 |
| 2022/0274576 A1* | 9/2022 | Ganzel | B60T 8/176 |
| 2023/0311833 A1* | 10/2023 | Ganzel | B60T 7/042 303/3 |
| 2024/0359675 A1* | 10/2024 | Weh | B60T 13/148 |
| 2024/0359676 A1* | 10/2024 | Jang | B60T 13/686 |

FOREIGN PATENT DOCUMENTS

| | | | | |
|---|---|---|---|---|
| DE | 202015008975 U1 | 6/2016 | | |
| DE | 202015008976 U1 | 7/2016 | | |
| DE | 102018205261 A1 | 10/2019 | | |
| DE | 102018208223 A1 | 11/2019 | | |
| DE | 102019107334 A1 | 8/2020 | | |
| DE | 202019107193 U1 | 12/2020 | | |
| DE | 102022213098 A1 | 6/2023 | | |
| GB | 2530371 A | * | 3/2016 | ............. B60T 7/042 |
| WO | 2015036623 A2 | 3/2015 | | |
| WO | 2016146692 A1 | 9/2016 | | |

OTHER PUBLICATIONS

R. Isermann: Fault-Diagnosis Applications. Model-Based Condition Monitoring: Actuators, Drives, Machinery', Plants, Sensors, and Fault-tolerant Systems. R. Isermann, Fault-Diagnosis Applications, Model-Based Condition Monitoring: Actuators, Drives, Machinery', Plants, Sensors, and Fault-tolerant Systems, Springer-Verlag Berlin Heidelberg 20 11, 285-286. DPMA Primo [online].

* cited by examiner

US 12,240,427 B2

FAST REPLENISHING BRAKE SYSTEM

TECHNICAL FIELD

This disclosure relates to an apparatus and method for use of a brake system and, more particularly, to a method and apparatus of a hydraulic brake system for actuating a plurality of brakes and having a fast replenishing feature.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

During particular operations, such as, but not limited to, braking very large vehicles, a plunger-type hydraulic braking pressure generator may reach the end of an operating stroke before a desired pressure level is built up in the brake system. In such a situation, it may be desirable to provide additional hydraulic fluid to the plunger-type hydraulic braking pressure generator.

SUMMARY

In an aspect, a fast-replenishing brake system is disclosed. The brake system includes a source of pressurized hydraulic fluid, a plurality of wheel brakes, and an iso/dump control valve arrangement associated with at least one wheel brake of the plurality of wheel brakes. A reservoir is hydraulically connected to the source of pressurized fluid and to the iso/dump control valve arrangement. An electronic control unit is operative to control the source of pressurized fluid and the iso/dump control valve arrangement. A fast-replenishing circuit includes a FR iso valve, a venting valve, and a replenishing check valve. The venting and replenishing check valves are interposed hydraulically between the source of pressurized fluid and the reservoir. The FR iso valve is interposed hydraulically between the source of pressurized fluid and the iso/dump control valve arrangement. When the source of pressurized fluid reaches a predetermined stroke position, the FR iso valve is energized to restrict movement of fluid from at least one iso/dump control valve arrangement to the source of pressurized fluid. The source of pressurized fluid is re-stroked to draw fluid from the reservoir through the replenishing check valve of the fast-replenishing circuit.

In an aspect, a fast-replenishing brake system having normal non-failure and backup braking modes is disclosed. The brake system includes first and second sources of pressurized hydraulic fluid and a plurality of wheel brakes, comprising a pair of front wheel brakes and a pair of rear wheel brakes. An iso/dump control valve arrangement is associated with at least one wheel brake of the plurality of wheel brakes. Each iso/dump control valve arrangement includes an iso valve and a dump valve. Each iso/dump control valve arrangement is fluidically connected to a selected one of the first and second sources of pressurized hydraulic fluid. A reservoir is hydraulically connected to the first and second sources of pressurized fluid. First and second electronic control units are each operative to control a respective first or second source of pressurized fluid and each iso/dump control valve arrangement which is associated with the selected one of the pair of front wheel brakes and the selected one of the pair of rear wheel brakes which are on a contralateral side of a vehicle. A crossover circuit places a chosen one of the pair of front wheel brakes into selective backup fluid communication with the one of the first and second sources of pressurized hydraulic fluid which supplies a same-side one of the pair of rear wheel brakes when the brake system is in a normal non-failure braking mode. A fast-replenishing circuit includes a FR iso valve, a venting valve, and a replenishing check valve. The venting and replenishing check valves are interposed hydraulically between the source of pressurized fluid and the reservoir. The FR iso valve is interposed hydraulically between the source of pressurized fluid and the iso/dump control valve arrangement. When the source of pressurized fluid reaches a predetermined stroke position, the iso valve is energized to restrict movement of fluid from the iso/dump control valve arrangement to the source of pressurized fluid. The source of pressurized fluid is re-stroked to draw fluid from the reservoir through the replenishing check valve of the fast-replenishing circuit. When the brake system is in the normal non-failure mode, each of the first and second sources of hydraulic fluid supplies pressurized hydraulic fluid to the selected one of the pair of front wheel brakes and the selected one of the pair of rear wheel brakes which are on opposite lateral sides of the vehicle. When the brake system is in the backup braking mode, the crossover circuit accordingly places a failed-side one of the pair of front wheel brakes into fluid communication with a remaining one of the first and second sources of pressurized fluid which is also supplying pressurized hydraulic fluid to the contralateral one of the pair of front wheel brakes in both the backup braking and normal non-failure braking modes.

In an aspect, a fast-replenishing brake system having normal non-failure and backup braking modes is disclosed. The brake system includes first and second sources of pressurized hydraulic fluid. A plurality of wheel brakes include a pair of front wheel brakes and a pair of rear wheel brakes. An iso/dump control valve arrangement is associated with at least one wheel brake of the plurality of wheel brakes. Each iso/dump control valve arrangement includes an iso valve and a dump valve. Each iso/dump control valve arrangement is fluidically connected to a selected one of the first and second sources of pressurized hydraulic fluid. A reservoir is hydraulically connected to the first and second sources of pressurized fluid. First and second electronic control units, are each operative to control a respective first or second source of pressurized fluid and each iso/dump control valve arrangement which is associated with the selected one of the pair of front wheel brakes and the selected one of the pair of rear wheel brakes which are on a contralateral side of a vehicle. A crossover circuit places a chosen one of the pair of front wheel brakes into selective backup fluid communication with the one of the first and second sources of pressurized hydraulic fluid which supplies an opposite-side one of the pair of rear wheel brakes when the brake system is in a normal non-failure braking mode. A fast-replenishing circuit of a dual-acting plunger type, comprising a venting valve and a replenishing check valve is provided. The replenishing check valve is interposed hydraulically between the source of pressurized fluid and the reservoir. The fast-replenishing circuit also includes first and second NC DAP valves. Each of the first and second NC DAP valves is interposed hydraulically between the respective first and second sources of pressurized fluid and at least one corresponding iso/dump control valve arrangement. When the source of pressurized fluid reaches a predetermined stroke position, the venting valve is energized when the source of pressurized hydraulic fluid is applying brake pressure, and the NC DAP valve being de-energized to allow the source of pressurized fluid to draw fluid from the reservoir. When the brake system is in the normal non-failure mode, each of the first and second sources of hydraulic fluid supplies pressurized hydraulic fluid to the selected one of the pair of front wheel brakes and the selected one of the pair of rear wheel brakes which are on the contralateral side of the vehicle. When the brake system is in the backup braking mode, the crossover circuit accordingly places a failed-side one of the pair of front wheel brakes into fluid communication with a remaining one of the first and second sources of pressurized fluid which is also supplying pressurized hydraulic fluid to the contralateral one of the pair of front wheel brakes in both the backup braking and normal non-failure braking modes.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
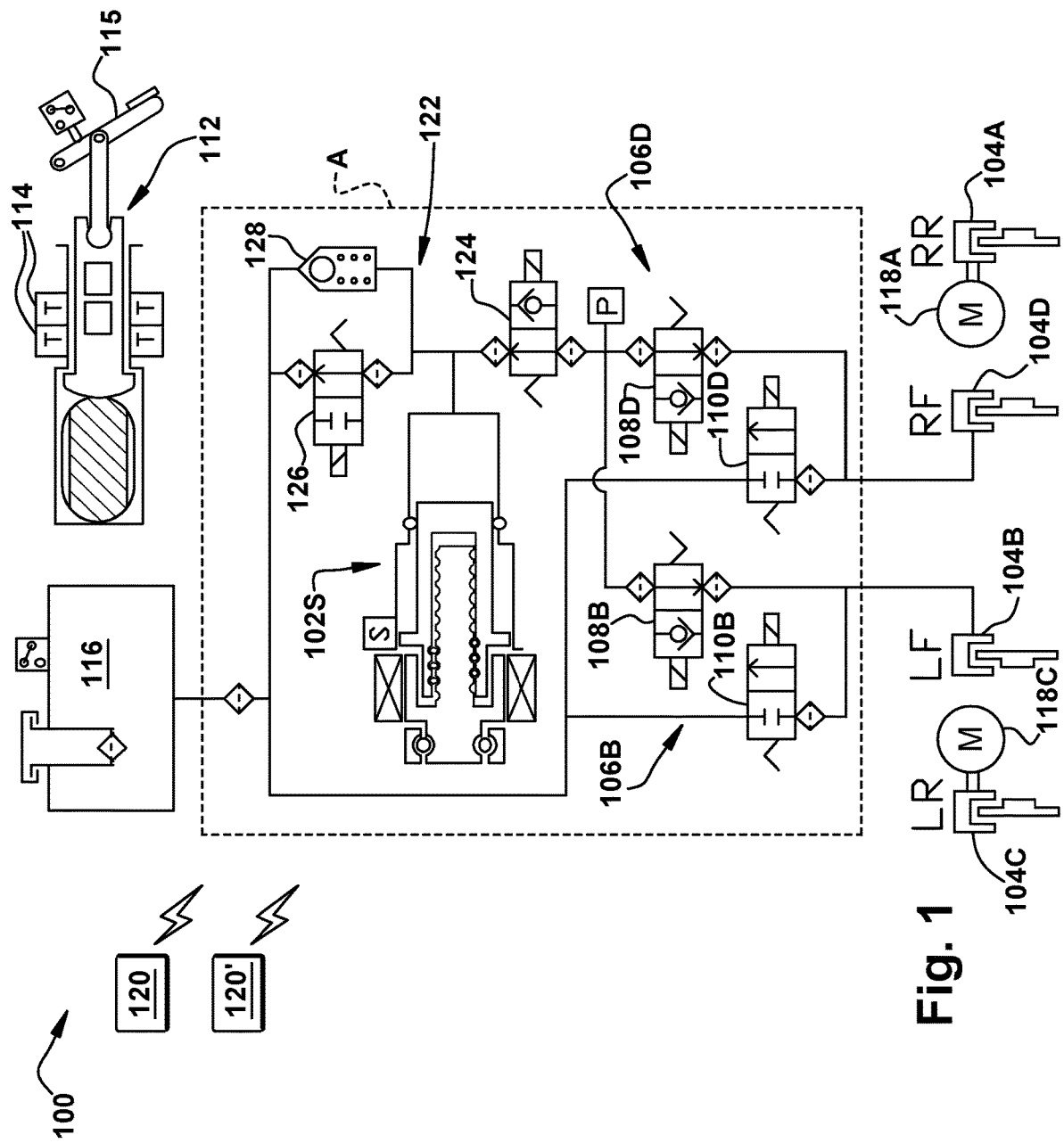
FIG. 1 is a schematic hydraulic diagram of a brake system according to an aspect of the present invention, in a first configuration.

FIG. 1 is a schematic depiction of a brake system 100 which includes a fast-replenishment feature. The brake system 100, or components thereof, may be or resemble, as one nonlimiting example, one or more of the brake systems shown and described in copending U.S. patent application Ser. No. 17/188,288, titled "Apparatus and Method for Control of a Hydraulic Brake System", filed 1 March 2021 and incorporated herein by reference in its entirety. Description of similar components and operation which is made elsewhere in this application will not necessarily be repeated for each and every described configuration or aspect of the brake system 100, for brevity, but should instead be considered to apply to like-numbered portions of other configurations as appropriate. Certain element numbers are appended with letters to indicate a position on a vehicle of a corresponding wheel, and one of ordinary skill in the art will be able to follow the included schematic diagrams and extrapolate corresponding or different vehicle positions, for the lettered elements.

The brake system 100 in the Figures includes a source of pressurized fluid 102, a plurality of wheel brakes 104, and an iso/dump control valve arrangement 106, each associated with at least one wheel brake of the plurality of wheel brakes 104. Each iso/dump control valve arrangement 106 selectively provides slip control to a corresponding wheel brake 104. Each iso/dump control valve arrangement 106 includes a corresponding iso valve 108 and a corresponding dump valve 110 for a corresponding wheel brake 104.

Figure 2:
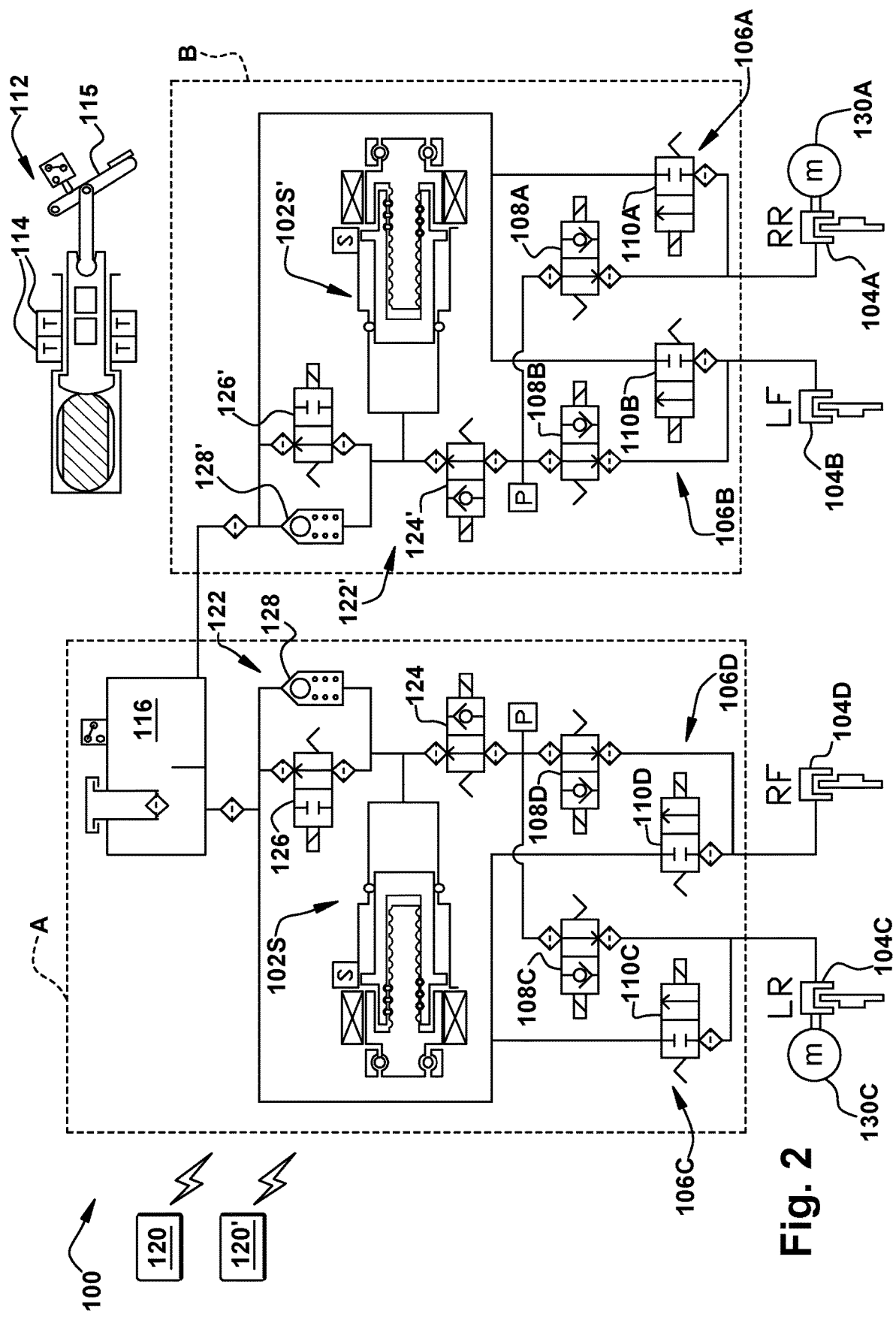
FIG. 2 is a schematic hydraulic diagram of a brake system according to an aspect of the present invention, in a second configuration.
Figure 3:
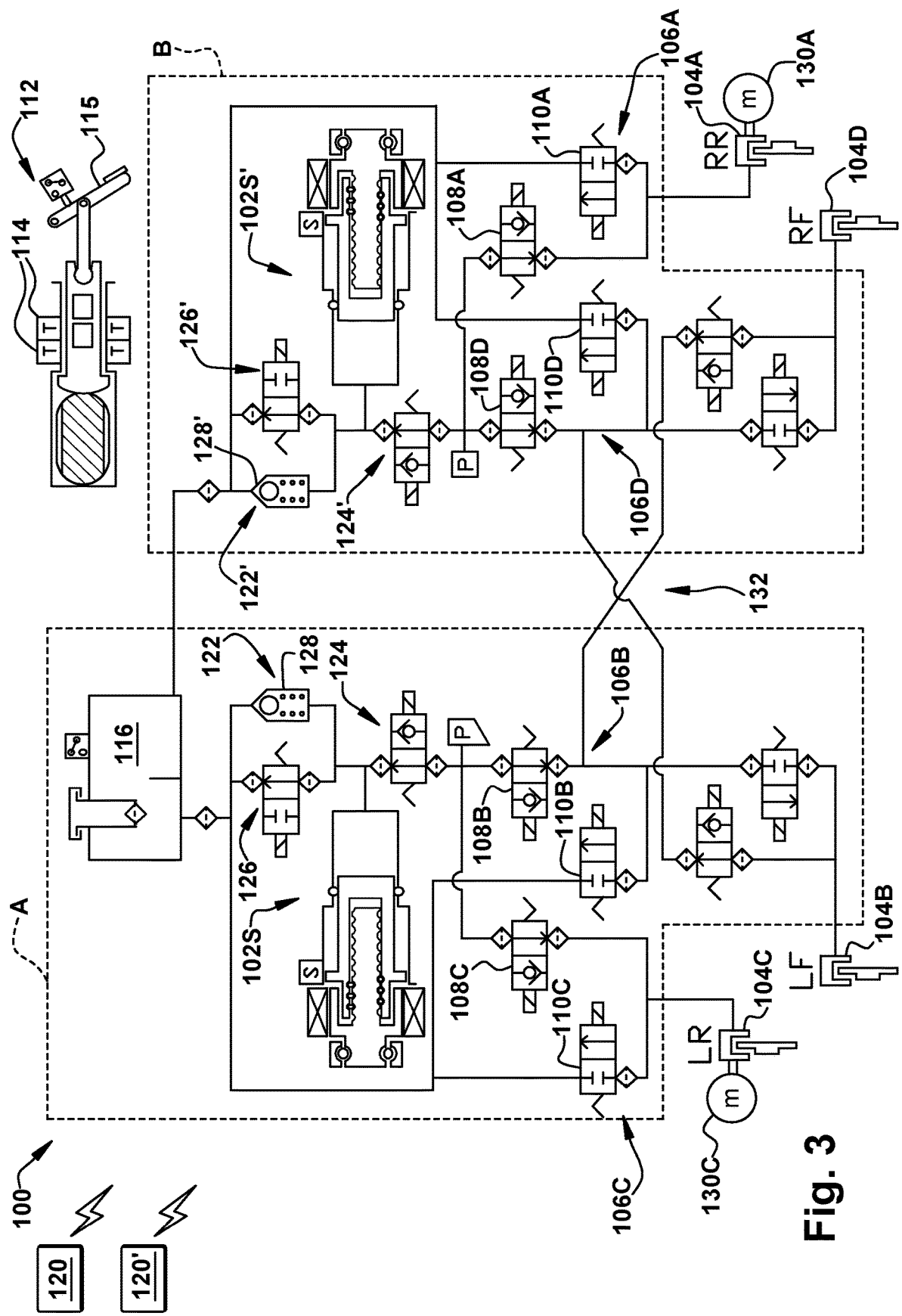
FIG. 3 is a schematic hydraulic diagram of a brake system according to an aspect of the present invention, in a third configuration.

In some use environments, and as shown in FIGS. 1-3, the source of pressurized fluid 102 may be a single-acting plunger ("SAP") unit 102S. A brake pedal assembly or other deceleration signal transmitter 112 (manual, autonomous, or automatic) may be provided to generate a braking command signal in any desired manner. For example, when the deceleration signal transmitter 112 includes a traditional brake pedal 115, a brake travel sensor 114 (here, four shown, for redundancy) may be operative to detect travel of the brake pedal 115 responsive to an operator's foot pressure and thereby responsively provide a braking command signal indicative of a desired braking action.

A reservoir 116 is hydraulically connected to the source of pressurized fluid 102 and to each iso/dump control valve arrangement 106.

An electric service braking motor 118 may be operative to actuate a selected wheel brake 104 which is not associated with an iso/dump control valve arrangement 106. Stated differently, the brake system 100 shown in FIG. 1 has hydraulically actuated front wheel brakes 104B, 104D and electrically actuated rear brakes 104A, 104C. One of ordinary skill in the art can provide any desired combination of hydraulic and/or electric control for any wheel brake 104 in the system.

An electronic control unit 120 is operative to control the source of pressurized fluid 102 and at least one iso/dump control valve arrangement 106, responsive to the braking command signal generated by the deceleration signal transmitter 112 or any other desired provider of a braking command signal (A.K.A. "brake signal"). The brake signal may be conveyed in any desired manner, including wired or wireless, to the electric control unit 120. The electronic control unit 120 may control at least one iso/dump control valve arrangement 106 in a non-failure normal braking mode to provide a slip control feature to a selected wheel brake 104.

The electronic control unit may be a first electronic control unit 120 operative to control the source of pressurized fluid 102S and at least one iso/dump control valve arrangement 106, as indicated by dashed-line box "A". The brake system 100 may include, as shown in FIG. 1, a second electronic control unit 120' operative to control at least one electric service braking motor 118 for redundant or backup functioning. When a second electronic control unit 120' is provided, one or more of the brake travel sensors 114 may provide a braking command signal to one or both of the electronic control units 120, 120', for desired redundancy in control and signal transmission.

An example of a suitable ECU 120 arrangement is disclosed in co-pending U.S. patent application Ser. No. 17/708,019, filed concurrently herewith and titled "Control Arrangement for a Brake System", which is incorporated by reference herein in its entirety for all purposes.

A fast-replenishing circuit 122, comprising a FR iso valve 124, a venting valve 126, and a replenishing check valve 128 is provided to the brake system 100 as shown in at least FIGS. 1-2, to provide desired fast replenishing features to the brake circuit 100. In the fast-replenishing circuit 122, the venting and replenishing check valves 126 and 128 are interposed hydraulically between the source of pressurized fluid 102S and the reservoir 116. The FR iso valve 124 is interposed hydraulically between the source of pressurized fluid 102S and at least one iso/dump control valve arrangement 106. The venting valve 126 and replenishing check valve 128 of the fast-replenishing circuit 122 may be arranged in parallel, as shown in at least FIGS. 1-3.

When the source of pressurized fluid (here, single-acting plunger type power transmission unit 102S) reaches a predetermined stroke position, the FR iso valve may be energized to restrict movement of fluid from at least one iso/dump control valve arrangement 106 to the source of pressurized fluid 102S. The source of pressurized fluid 102S can then be re-stroked to rapidly draw fluid from the reservoir 116 through the replenishing check valve 128 of the fast-replenishing circuit 122, and thus enable further fluid pressure to be sent to the hydraulically operated ones of the wheel brakes 104 as desired. As a result, the fast-replenishing circuit 122 may assist with continued building toward a desired level of pressure in the associated brakes 104, as desired, without a significant delay time during retraction of the single plunger of the single-acting plunger type power transmission unit 102S.

Turning now to FIG. 2, a brake system 100 which bears some similarities to the brake system 100 of FIG. 1 is shown. In the brake system 100 of FIG. 2, all four of the wheel brakes 104 are shown as being hydraulically operated, with the two rear wheel brakes 104A, 104C additionally being provided with an electric backup motor 130 for selectively actuating the selected wheel brake 104 in a backup braking mode. In most use environments, the electric backup motors 130 will be less robust or powerful than a "primary" electric service brake motor 118 in that position would be, since the electric backup motors 130 are supplemental to the hydraulic operation of each "backed up" wheel brake 104. To that end, however, and when first and second electronic control units 120, 120' are both provided to the brake system 100 (as in the FIG. 2 arrangement), the electric backup motor 130 for each selected wheel brake 104 may be controlled by a chosen one of the first and second electronic control units 120, 120' which does not control the iso/dump control valve arrangement 106 respective to the selected wheel brake 104. As a result, the "backed up" wheel brakes 104 have some redundancy in control and actuation types which may be helpful in maintaining some function in the brake system 100 when one of the electronic control units 120, 120' is not available. It should be noted that, in the brake systems 100 schematically depicted in at least FIGS. 2-4, each of the plurality of wheel brakes 104 may include a corresponding iso/dump control valve arrangement 106, though it is also contemplated that one or more of the wheel brakes 104 may be separated from the hydraulic components of the respective brake system 100 (i.e., does not have an associated iso/dump control valve arrangement 106) and is provided instead with an electric service braking motor 118, such as those shown and described with reference to FIG. 1.

Figure 4:
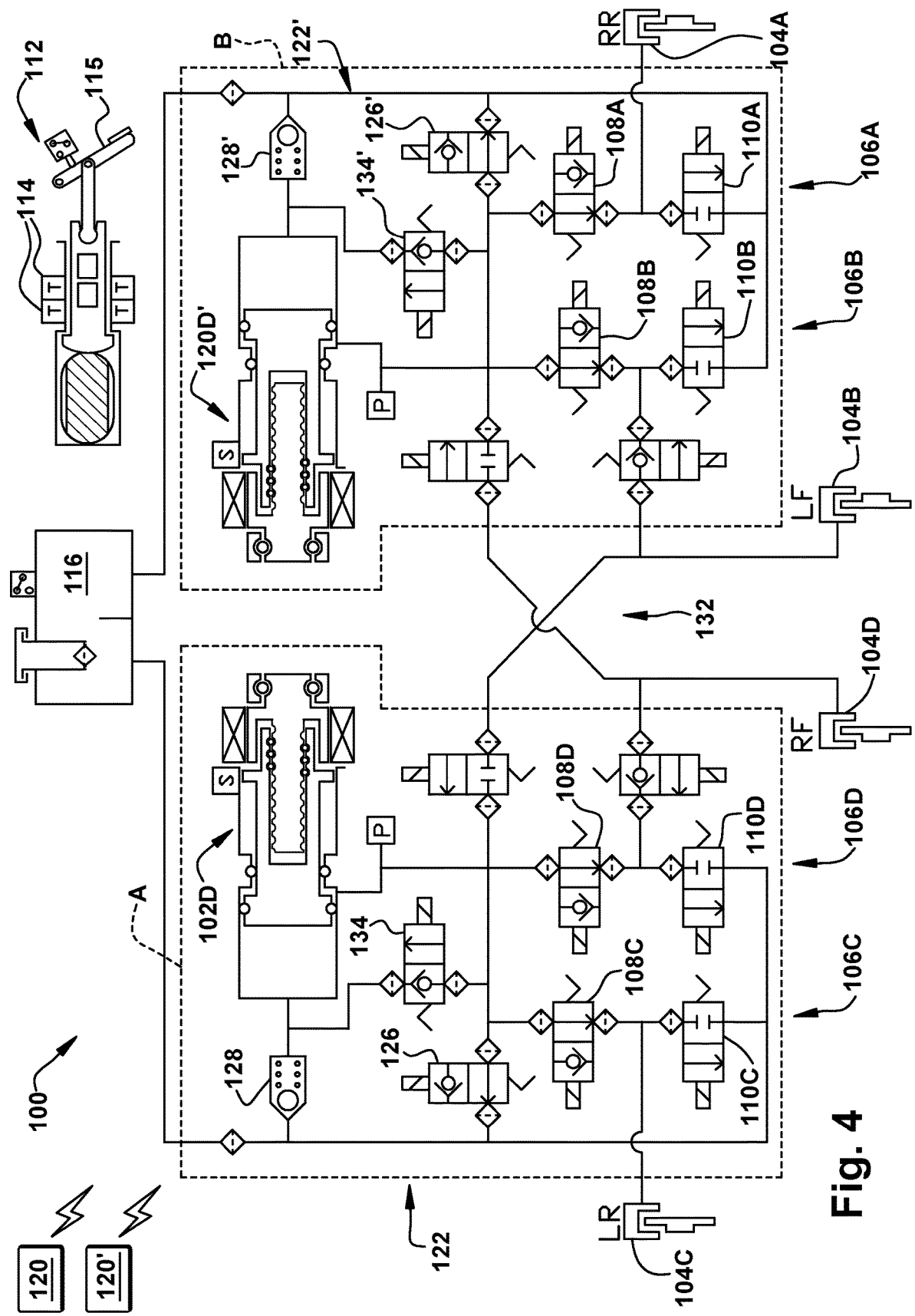
FIG. 4 is a schematic hydraulic diagram of a brake system according to an aspect of the present invention, in a fourth configuration.

As is also apparent from FIG. 2, the depicted brake system 100 has more duplication in components and function than does the similar brake system 100 of FIG. 1. Similar (though not necessarily identical) duplicate components in FIGS. 2-4 include a "prime" mark added to the element number, for differentiation. FIGS. 2-4 each include two "sides" to the brake system 100, denoted by dashed lines "A" and "B". The two sides A and B may be co-located in a single housing and/or location of the vehicle, or may be spaced apart from one another.

With reference to side A of FIG. 2, the electronic control unit is a first electronic control unit 120, the source of pressurized fluid is a first source of pressurized fluid 102S (here, shown as a single-acting plunger type power transmission unit), the fast-replenishing circuit is a first fast-replenishing circuit 122, and the at least one iso/dump control valve arrangement is at least one first iso/dump control valve arrangement (two shown as 106C and 106D). With reference to side B of FIG. 2, the brake system 100 includes a second electronic control unit 120', a second source of pressurized fluid 102S' (also shown as a single-acting plunger type power transmission unit), at least one second iso/dump control valve arrangement (two shown as 106A and 106B), and a second fast-replenishing circuit 122'.

The second electronic control unit 120' is operative to control at least one of the second source of pressurized fluid 102S', the second fast-replenishing circuit 122', and the at least one second iso/dump control valve arrangement 106A, 106B.

The first source of pressurized fluid 102S (on side "A") supplies pressurized hydraulic fluid to at least one chosen wheel brake (here, 104C and/or 104D) of the plurality of wheel brakes via the at least one first iso/dump control valve arrangement (here, 106C and/or 106D). The second source of pressurized fluid 102S' (on side "B") supplies pressurized hydraulic fluid to at least one other wheel brake (here, 104A and/or 104B) of the plurality of wheel brakes via the at least one second iso/dump control valve arrangement (here, 106A and/or 106B).

The first electronic control unit 120 controls at least one iso/dump control valve arrangement 106 in a non-failure normal braking mode to provide a slip control feature to a selected wheel brake 104 corresponding to the first source of pressurized fluid 102S. The second electronic control unit 120' controls at least one iso/dump control valve arrangement 106 in a non-failure normal braking mode to provide a slip control feature to a selected wheel brake 104 corresponding to the second source of pressurized fluid 102S'. Again, as shown, dashed-line boxes "A" and "B" are provided in the Figures to differentiate the two "sides" of the brake system 100, but one of ordinary skill in the art can readily configure a suitable arrangement for a vertically split, diagonally split, or otherwise configured brake system 100.

As shown in FIG. 2, the deceleration signal transmitter 112 includes a brake pedal 115 and at least two brake sensors 114. Each brake sensor 114 produces a braking command signal, or a brake signal, responsive to actuation of the brake pedal 115. A chosen one of the brake sensors 114 provides a brake signal in any desired wired or wireless manner to the first electronic control unit 120, and an other one of the brake sensors 114 provides a brake signal in any desired wired or wireless manner to the second electronic control unit 120'. Such redundant control may be of assistance in maintaining brake system 100 function in the event of malfunction or unavailability of one or more components. It is contemplated that one or more manual, automatic, and/or autonomous brake signal generators or other brake signal generating means may likewise provide brake signals to one or more of the electronic control units 120, 120' as desired.

The fast-replenishing circuits 122, 122' shown in the brake system 100 of FIG. 2 operate similarly to those of FIG. 1, and thus further description will be omitted here, as previously mentioned.

FIGS. 3-4 are schematic depictions of a brake system 100. The brake system 100, or components thereof, may be or resemble, as one nonlimiting example, one or more of the brake systems shown and described in copending U.S. patent application Ser. No. 17/188,288, titled "Apparatus and Method for Control of a Hydraulic Brake System", filed 1 Mar. 2021 and incorporated herein by reference in its entirety, for all purposes. The brake system 100, or components thereof, may also be or resemble, as another nonlimiting example, one or more of the brake systems shown and described in copending U.S. patent application Ser. No. 17/708,108, titled "Normally Closed Hydraulic Valve and Brake System Using Same", filed concurrently herewith and incorporated herein by reference in its entirety, for all purposes (hereafter referenced as "the NC Valve application"). Description of similar components and operation which is made elsewhere in this application will not necessarily be repeated for each and every described configuration or aspect of the brake system 100, for brevity, but should instead be considered to apply to like-numbered structures elsewhere in this application, or like-configured structures in the NC valve application as appropriate. One of ordinary skill in the art will be readily able to analogize the structures and functions of the brake systems 100 shown in FIGS. 3-4 to those in the NC Valve application.

With reference now to FIG. 3, each of the single-acting plunger type first and second sources of pressurized hydraulic fluid 102S, 102S' is configured to supply hydraulic fluid, when the brake system 100 is in the normal non-failure mode, to a selected one of the rear wheel brakes 104A, 104C, as well as to a front wheel brake 104B, 104D which is on an opposite lateral side as the rear wheel brake 104A, 104C corresponding to that respective first or second source of pressurized fluid 102S, 102S'. A crossover circuit (shown generally at 132) places a chosen one of the pair of front wheel brakes 104 into selective backup fluid communication with the one of the first and second sources of pressurized hydraulic fluid 102S, 102S' which supplies a same-side one of the pair of rear wheel brakes 104A, 104C when the brake system 100 is in a normal non-failure braking mode. Additional details regarding the crossover circuit 132 and related valves are provided in the NC Valve application.

When the brake system 100 is in the normal non-failure mode, each of the first and second sources of pressurized hydraulic fluid 102S, 102S' supplies pressurized hydraulic fluid to the selected one of the pair of front wheel brakes 104B, 104D and the selected one of the pair of rear wheel brakes 104A, 104C which are on opposite lateral sides of the vehicle. When the brake system 100 is in the backup braking mode, the crossover circuit 132 accordingly places a failed-side one of the pair of front wheel brakes 104B, 104D into fluid communication with a remaining one of the first and second sources of pressurized fluid 102S, 102S' which is also supplying pressurized hydraulic fluid to the contralateral one of the pair of front wheel brakes 104B, 104B in both the backup braking and normal non-failure braking modes.

Stated differently, in the brake system 100 of FIG. 3, the first source of pressurized fluid 102S supplies hydraulic fluid to left rear wheel brake 104C and right front wheel brake 104D in a normal, non-failure braking mode, and additionally to those (when in a backup braking mode), supplies fluid to left front wheel brake 104B when the second ECU 120', the second source of pressurized fluid 102S', or any other component of the brake system 100 inside dashed box "B" of FIG. 3 is not available for operation. Likewise, in the brake system 100 of FIG. 3, the second source of pressurized fluid 102S' supplies hydraulic fluid to right rear wheel brake 104A and left front wheel brake 104B in a normal, non-failure braking mode, and additionally to those (when in a backup braking mode), supplies fluid to right front wheel brake 104D when the first ECU 120, the first source of pressurized fluid 102S, or any other component of the brake system 100 inside dashed box "A" of FIG. 3 is not available for operation While FIG. 3 depicts the pair of rear wheel brakes 104A, 104C as each including an electric backup motor 130A, 130C, it is contemplated that any one of the wheel brakes 104 could be removed from hydraulic connection to the remaining portions of the brake system 100 and instead include an electric service braking motor (not shown) operative to actuate one or more selected wheel brakes which are not associated with an iso/dump control valve arrangement.

Finally, with reference to FIG. 4, a fast-replenishing brake system 100 having normal non-failure and backup braking modes is depicted. In the brake system 100 of FIG. 4, the first and second sources of pressurized hydraulic fluid are first and second dual-acting plunger type sources of pressurized hydraulic fluid 102D and 102D'.

Like the brake system 100 of FIG. 3, the brake system 100 of FIG. 4 includes a crossover circuit 132 placing a chosen one of the pair of front wheel brakes 104B, 104D into selective backup fluid communication with the one of the first and second sources of pressurized hydraulic fluid 102D, 102D' which supplies a opposite-side one of the pair of rear wheel brakes 104A, 104C when the brake system 100 is in a normal non-failure braking mode, and supplies both of the pair of front wheel brakes 104B, 104D when the brake system 100 is in a backup braking mode.

Stated differently, in the brake system 100 of FIG. 4, the first source of pressurized fluid 102D supplies hydraulic fluid to left rear wheel brake 104C and right front wheel brake 104D in a normal, non-failure braking mode, and additionally to those (when in a backup braking mode), supplies fluid to left front wheel brake 104B when the second ECU 120', the second source of pressurized fluid 102D', or any other component of the brake system 100 inside dashed box "B" of FIG. 4 is not available for operation. Likewise, in the brake system 100 of FIG. 4, the second source of pressurized fluid 102D' supplies hydraulic fluid to right rear wheel brake 104A and left front wheel brake 104B in a normal, non-failure braking mode, and additionally to those (when in a backup braking mode), supplies fluid to right front wheel brake 104D when the first ECU 120, the first source of pressurized fluid 102D, or any other component of the brake system 100 inside dashed box "A" of FIG. 4 is not available for operation.

Because of the differences between single-acting plungers and dual-acting plungers, the fast-replenishing circuits (shown here as fast-replenishing circuits of a dual-plunger type, i.e., dual-acting plunger circuits 122, 122') of FIG. 4 differ somewhat in structure from those of FIGS. 1-3, but operate analogously. The dual-acting plunger circuits 122, 122' of FIG. 4 each comprise a venting valve 126 and a replenishing check valve 128. The replenishing check valve 128 is interposed hydraulically between the source of pressurized fluid 102D, 102D' and the reservoir 116. Each dual-acting plunger circuit 122, 122' of the brake system 100 of FIG. 4 also includes first and second NC DAP valves 134 and 134'. Each of the first and second NC DAP valves 134 and 134' is interposed hydraulically between the respective first and second sources of pressurized fluid 102D and 102D' and at least one corresponding iso/dump control valve arrangement 106.

When the source of pressurized fluid 102D, 102D' reaches a predetermined stroke position, the venting valve 126 is energized when the source of pressurized fluid 102D, 102D' is applying brake pressure, whether the dual-acting plunger is stroking forward or reverse. A corresponding NC DAP valve 134, 134' is de-energized to allow the source of pressurized fluid 102D, 102D' to draw fluid from the reservoir 116, via a reverse stroke of the dual-acting plunger.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein.

In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A fast-replenishing brake system, comprising:
    a source of pressurized fluid;
    a plurality of wheel brakes;
    an iso/dump control valve arrangement associated with at least one wheel brake of the plurality of wheel brakes;
    a reservoir hydraulically connected to the source of pressurized fluid and to the iso/dump control valve arrangement;
    an electronic control unit operative to control the source of pressurized fluid and the iso/dump control valve arrangement; and
    a fast-replenishing circuit, comprising a FR iso valve, a venting valve, and a replenishing check valve, the venting and replenishing check valves being interposed hydraulically between the source of pressurized fluid and the reservoir, and the FR iso valve being interposed hydraulically between the source of pressurized fluid and the iso/dump control valve arrangement;

wherein, when the source of pressurized fluid reaches a predetermined stroke position, the FR iso valve is energized to restrict movement of fluid from at least one iso/dump control valve arrangement to the source of pressurized fluid, and the source of pressurized fluid is re-stroked to draw fluid from the reservoir through the replenishing check valve of the fast-replenishing circuit;

wherein the electronic control unit is a first electronic control unit, the source of pressurized fluid is a first source of pressurized fluid, the iso/dump control valve arrangement is a first iso/dump control valve arrangement, and the fast-replenishing circuit is a first fast-replenishing circuit;

wherein the brake system includes a second electronic control unit, a second source of pressurized fluid, a second iso/dump control valve arrangement, and a second fast-replenishing circuit associated with the second source of pressurized fluid;

wherein the second electronic control unit is operative to control the second source of pressurized fluid and the second iso/dump control valve arrangement;

wherein the first source of pressurized fluid supplies pressurized hydraulic fluid to at least one chosen wheel brake of the plurality of wheel brakes via the first iso/dump control valve arrangement; and wherein the second source of pressurized fluid supplies pressurized hydraulic fluid to at least one other wheel brake of the plurality of wheel brakes via the second iso/dump control valve arrangement.

2. The fast-replenishing brake system of claim 1, wherein the venting valve and check valve of the first and second fast-replenishing circuits are arranged in parallel.

3. The fast-replenishing brake system of claim 1, wherein each iso/dump control valve arrangement selectively provides slip control to a corresponding wheel brake.

4. The fast-replenishing brake system of claim 3, wherein each iso/dump control valve arrangement includes a corresponding iso valve and a corresponding dump valve for a corresponding wheel brake.

5. The fast-replenishing brake system of claim 1, wherein a brake signal is conveyed wirelessly to at least one of the first and second electronic control units.

6. The fast-replenishing brake system of claim 1, wherein a deceleration signal transmitter includes a brake pedal and a brake sensor, the brake sensor providing a brake signal responsive to actuation of the brake pedal, the brake sensor providing the brake signal to at least one of the first and second electronic control units.

7. The fast-replenishing brake system of claim 1, wherein each of the plurality of wheel brakes includes a corresponding iso/dump control valve arrangement.

8. The fast-replenishing brake system of claim 7, wherein at least one selected wheel brake of the plurality of wheel brakes includes an electric backup motor for selectively actuating the selected wheel brake in a backup braking mode, the electric backup motor being controlled by a chosen one of the first and second electronic control units which does not control the iso/dump control valve arrangement respective to the selected wheel brake.

9. The fast-replenishing brake system of claim 1, including an electric service braking motor operative to actuate a selected wheel brake which does not have an associated iso/dump control valve arrangement.

10. The fast-replenishing brake system of claim 1, wherein at least one of the first and second sources of pressurized hydraulic fluid is of a single acting plunger type.

11. The fast-replenishing brake system of claim 1, wherein a deceleration signal transmitter includes a brake pedal and at least two brake sensors, each brake sensor providing a brake signal responsive to actuation of the brake pedal, a chosen one of the brake sensors providing a brake signal to the first electronic control unit, and an other one of the brake sensors providing a brake signal to the second electronic control unit.

12. The fast-replenishing brake system of claim 1, wherein the first electronic control unit controls at least one iso/dump control valve arrangement in a non-failure normal braking mode to provide a slip control feature to a selected wheel brake corresponding to the first source of pressurized fluid, and wherein the second electronic control unit controls at least one iso/dump control valve arrangement in a non-failure normal braking mode to provide a slip control feature to a selected wheel brake corresponding to the second source of pressurized fluid.

* * * * *